3,353,948
METHOD OF PREPARING AN ORGANIC SOIL CONDITIONER
George R. Sroda, Amherst Junction, Wis. 54407
No Drawing. Filed Sept. 9, 1964, Ser. No. 395,284
5 Claims. (Cl. 71—21)

ABSTRACT OF THE DISCLOSURE

A method of producing a substantially viable weed seed free organic fertilizer by composting a cellulosic viable weed seed free material with a viable weed seed free turkey manure for approximately two weeks within a structural enclosure under conditions protected from the weather so as to substantially preclude contamination of the compost with viable weed seeds.

---

This invention relates to a method of preparing a soil conditioner and more particularly to a method of preparing an organic soil conditioner and fertilizer produced from poultry manure and fibrous material which is free of noxious weed seeds, insecticides, herbicides or fungicides, and has the ability to open tight or clay soils and close loose or sandy soils, thus improving the general tilth of the soil.

Previous attempts to produce natural organic soil conditioners and fertilizers have resulted in a product which is not entirely satisfactory when utilized to improve the tilth of the soil and to improve moisture control, aeration, and fertility. Soil conditioners of this nature are generally produced with animal manures and fibrous materials which are contaminated with the chemical contaminants and seeds of undesirable weeds which were ingested by the animal and passed through the digestive tract without any significant loss of viability. When the soil conditioner is utilized the chemical contaminants such as insecticides, herbicides or fungicides may have a deleterious effect upon the crop. In addition, the germination of viable weed seeds tends to deplete the soil of nutrients intended for the crop being raised. Previous attempts to produce natural organic soil conditioners free of viable weed seeds were generally directed to the curing of the material at relatively high temperatures and thus resulted in the destruction of valuable heat liable plant nutrients which would normally be available to the plants.

Many of the soil conditioners known in the art are only effective in improving the tilth of the soil for a relatively short period of time and are actually detrimental to the preferred approximately neutral reaction of the soil, as well as depriving the plants of vital nitrogen as the soil conditioner decomposes.

An important object of this invention is the production of a natural organic soil conditioner and fertilizer of an improved nature.

Another object of this invention is to set forth a method by which an improved natural organic soil conditioner and fertilizer may be produced which retains a maximum of the plant nutrients thus making these nutrients available for the plant roots.

Still another object of this invention is the production of an improved natural soil conditioner which improves the tilth of the soil and does not deplete the soil of vital plant growth nutrients, such as nitrogen.

A further object of this invention is the production of an improved natural organic soil conditioner and fertilizer which is produced from natural organic nutrients substantially free from viable seeds, insecticides, herbicides, or fungicides.

Still a further object of this invention is the production of an improved natural organic soil conditioner which in use helps to retain soil moisture and longer lasting and of continuous action rather than only providing a quick nutrient "boost" of only short duration.

These and other objects will become more apparent from the description which follows which is to be taken as illustrative rather than limitative of this invention.

As well known in the art poultry manures are a valuable source of organic plant nutrients. The poultry manures utilized in carrying forth the present invention are produced under rather exacting conditions and are in a sense unlike the usual droppings collected from poultry farms which are contaminated with weed seeds, insecticides, herbicides or fungicides.

More specifically the practice of my invention requires the use of a pultry manure, such as, for example, turkey manure which is substantially free of weed seeds, insecticides, herbicides, or fungicides. A manure of this nature must be gathered from animals which are grown in confinement only. The poultry houses in which the birds are confined are kept sanitary without the use of insecticide sprays, or the like, thus precluding the possibility of the contamination of the droppings.

The birds are fed a ration of high protein and mineral content thus assuring a manure of consistently high plant nutrient analysis, and any weed seeds which may happen to be in the grain ration are destroyed by the grinding action of the bird's gizzard.

Additionally the practice of my invention requires the use of a fibrous material such as peat moss, or the like, which is a Sphagnum moss harvested from the surface of the bogs. Other fibrous materials such as wood shavings, sawdust, and penaut hulls may be used in place of the Shapgnum moss.

In carrying out the process of my invention weed and disease free fibrous material such as Sphagnum moss, importd from Canada or Germany, is spread on the moisture impervious floor of a building enclosed from the elements, in a layer of approximately 18 to 24 inches. Potable water, of sufficient quantity, or about 10 times the weight of the moss is then sprayed over the top of the Sphagnum moss until the moss is moistened.

The layer of moistened moss is then covered with uncontaminated turkey manure which is produced under the exacting conditions previously set forth in an enclosed poultry house. The manure is added in the ratio of approximately 1 part of manure to 10 parts of Sphagnum. When the entire layer of Sphagnum is covered as stated, additional potable water is sprayed on to thoroughly moisten the manure. The mixture is then blended by utilizing a portable motor driven blending or mixing unit having rotating tines, or the like. A source of potable water is attached adjacent to the control handle of the mixer so that additional water may be sprayed on the mixture during the blending operation to insure thorough moistening. The mixture is now comprised of approximately 10–20 parts water.

After the thoroughly moistened manure and Sphagnum have been intimately mixed the pile is allowed to compost. The processing building is maintained at a minimum temperature of 70° F. to help the manure compost, however, the temperature of the compost pile is controlled to a maximum of approximately 115° F. The action of micro-organisms working tends to maintain the temperature of the mixture in order to insure proper composting.

In other processes where composting is carried on outdoors much of the valuable nutrients, such as nitrogen, are lost thus decreasing the value of the product. In the present process, while the heating and composting is going on, most of the nitrogen, instead of being lost, is trapped with the fine absorbent fibrous structure of the Sphagnum moss thus assuring a product of highest quality.

During the composting the heat generated tends to dry out the surface of the compost pile and accordingly additional water is sprayed on the surface in order to assure sufficient moisture for the microbioligical reaction taking place within the pile. The composting operation takes approximately two weeks at which time the manure has decomposed and is in a form which may be readily assimilated by the plants. In order to insure uniformity the composted pile is once again blended with the portable mixer.

The finished product is now ready to be packaged in suitable hermetically sealed containers, such as plastic bags.

A specific example of the product of this process is comprised of approximately 1 part of uncontaminated turkey manure,
10 parts of sphagnum peat moss,
10–20 parts water on a weight basis.

In use the soil conditioner is mixed in a ratio of approximately ⅓ soil conditioner to approximately ⅔ soil.

The use of this product has been found to improve the tilth of the soil as well as improving the moisture retention properties and fertility of the soil. Unlike many other soil conditioners no nitrogen is depleted from the soil. The soil conditioner also makes an excellent plant mulch which may be spread on the surface of the ground in a layer one or two inches thick to help keep the ground temperature 8 to 10° F. cooler during hot weather, thus promoting sturdy root growth. Wood shavings, sawdust, or peanut hulls may be used in place of the sphagnum moss.

While preferred forms of the invention have been set forth, it is to be understood that variations may be made, within the scope of the appended claims, without departing from the spirit of the invention.

What is claimed as new is as follows:

1. The method of making a viable weed seed free natural organic soil conditioner which comprises the steps of: forming an elongated pile of a fibrous cellulosic viable weed seed free material selected from the group of cellulosic materials consisting of sphagnum peat moss, wood shavings, sawdust and peanut hulls of about 18 to 24 inches in depth; moistening said pile of fibrous material with about 10 times its weight of water; collecting turkey manure which has been rendered free of viable weed seeds by the grinding effect of the turkey's gizzard; spreading a layer of the viable weed seed free turkey manure on said pile of fibrous material in the ratio of about one part by weight of manure to ten parts by weight of fibrous cellulosic material and moistening the surface of the manure; forming an intimate admixture of said fibrous material and manure; and composting the admixture at a temperature of approximately 70° to 115° F. for approximately two weeks within a structural enclosure under conditions protected from the weather whereby the compost does not become contaminated with viable weed seeds whereby a viable weed seed free soil conditioner is produced without the necessity of prolonged composting of the components to effect the destruction of any viable weed seeds contained therein; and collecting a viable weed seed free organic soil conditioner.

2. The method of claim 1 wherein the fibrous cellulosic material is sphagnum moss.

3. The method of claim 1 wherein the fibrous cellulosic material is wood shavings.

4. The method of claim 1 wherein the fibrous cellulosic material is sawdust.

5. The method of claim 1 wherein the fibrous cellulosic material is peanut hulls.

References Cited

UNITED STATES PATENTS

| | | | |
|---|---|---|---|
| 2,035,286 | 3/1936 | Wenzel | 71—21 |
| 2,750,269 | 6/1956 | Klein | 71—21 |
| 3,165,394 | 1/1965 | Rausing | 71—21 X |

DONALL H. SYLVESTER, *Primary Examiner.*

R. BAJEFSKY, *Assistant Examiner.*